(12) United States Patent
Endo

(10) Patent No.: US 9,995,903 B2
(45) Date of Patent: Jun. 12, 2018

(54) LENS DEVICE

(71) Applicant: Nittoh Inc., Suwa-shi, Nagano (JP)

(72) Inventor: Junichi Endo, Suwa (JP)

(73) Assignee: Nittoh Inc. (JP)

( * ) Notice: Subject to any disclaimer, the term of this patent is extended or adjusted under 35 U.S.C. 154(b) by 0 days. days.

(21) Appl. No.: 15/292,631

(22) Filed: Oct. 13, 2016

(65) Prior Publication Data

US 2017/0108661 A1    Apr. 20, 2017

(30) Foreign Application Priority Data

Oct. 14, 2015   (JP) .................................. 2015-202650

(51) Int. Cl.
| | | |
|---|---|---|
| *G02B 7/02* | (2006.01) | |
| *H04N 5/225* | (2006.01) | |
| *G03B 17/00* | (2006.01) | |
| *G02B 7/10* | (2006.01) | |

(52) U.S. Cl.
CPC ............. *G02B 7/102* (2013.01); *G02B 7/026* (2013.01); *H04N 5/2254* (2013.01)

(58) Field of Classification Search
CPC . G02B 7/08; G02B 7/023; G02B 7/04; G02B 7/02; G02B 7/021; G02B 3/00; G02B 7/022; G02B 7/14; G03B 17/04; G03B 13/36; G03B 17/14; G03B 2217/002; H04N 5/2254–5/2257; H04N 5/2252; H04N 5/23209; G11B 7/0932
USPC .............. 359/811–830, 489.2, 808; 348/360, 348/373–376; 396/422, 424, 504, 396/529–533
See application file for complete search history.

(56) References Cited

U.S. PATENT DOCUMENTS

| | | |
|---|---|---|
| 9,207,424 B2 | 12/2015 | Aiba et al. |
| 2015/0124342 A1* | 5/2015 | Aiba ...................... G03B 17/14 359/830 |

FOREIGN PATENT DOCUMENTS

WO    WO-2014-050333 A1    4/2014

* cited by examiner

*Primary Examiner* — Dawayne A Pinkney
(74) *Attorney, Agent, or Firm* — Harness, Dickey & Pierce, P.L.C.

(57) ABSTRACT

Provided is a lens device, including: a lens barrel, a control unit mounted to the lens barrel; and a cable having one end connected to the control unit. In the lens device, a cable housing groove configured to house a part of the cable therein in such a manner that the part of the cable is wound around the cable housing groove from a radially outer side of the lens barrel is formed along a circumferential direction of the lens barrel so as to be exposed.

9 Claims, 4 Drawing Sheets

LENS DEVICE

CROSS-REFERENCE TO RELATED APPLICATION

This application claims priority to Japanese Application No. 2015-202650 filed Oct. 14, 2015, the entire disclosure of which is hereby incorporated by reference.

BACKGROUND OF THE INVENTION

Field of the Invention

The present invention relates to a lens device to be mounted to an imaging apparatus for use.

Background

Hitherto, a monitoring camera lens device to be mounted to a monitoring camera for use is known (see, for example, Japanese Patent No. 5706049). This lens device includes a lens barrel, a ring member, and a mount member. An iris meter for controlling the aperture of the lens device is mounted to the lens barrel. One end of a cable (iris cable) is connected to the iris meter. The ring member is fixed to one end of the lens barrel in an optical axis direction of the lens barrel. The mount member is fixed to the ring member while sandwiching the ring member between the mount member and the lens barrel in the optical axis direction of the lens barrel.

In the lens device, an inner-wall ring and an outer-wall ring that have different diameters are formed in the ring member. A portion between the inner-wall ring and the outer-wall ring in the radial direction is a cable housing portion configured to house a part of the cable therein. Notches are formed at two locations in the outer-wall ring. Two protrusions for pressing the cable are formed on the mount member at positions corresponding to the notches of the outer-wall ring. The mount member is mounted so as to cover the cable housing portion. With the mount member mounted, the notches of the outer-wall ring and the protrusions of the mount member form an opening through which the cable is led toward the cable housing portion and an opening through which the cable is led out from the cable housing portion.

In the lens device, when the cable led into the cable housing portion between the inner-wall ring and the outer-wall ring through one opening is wound around the cable housing portion and is then led out through the other opening, a lead-out length of the cable led out from the lens device is reduced. In the lens device, when the cable led into the cable housing portion through one opening is led out through the other opening without being wound around the cable housing portion, the lead-out length of the cable led out from the lens device is increased. In this manner, the lens device described in Japanese Patent No. 5706049 can adjust the lead-out length of the cable led out from the lens device.

The lens device described in Japanese Patent No. 5706049 can adjust the lead-out length of the cable led out from the lens device as described above. In the lens device, however, the cable housing portion is covered with the mount member, and hence the lead-out length of the cable led out from the lens device cannot be adjusted unless the mount member is removed. Therefore, in the lens device, the work of changing the lead-out length of the cable led out from the lens device is complicated after the lens device is assembled.

SUMMARY OF THE INVENTION

It is therefore an object of the present invention to provide a lens device capable of easily changing a lead-out length of a cable led out from the lens device even after the lens device is assembled.

In order to achieve the object, a lens device of the present invention includes: a lens barrel; a control unit mounted to the lens barrel; and a cable having one end connected to the control unit. In the lens device, a cable housing groove configured to house a part of the cable therein in such a manner that the part of the cable is wound around the cable housing groove from a radially outer side of the lens barrel is formed along a circumferential direction of the lens barrel so as to be exposed.

In the lens device of the present invention, the cable housing groove configured to house a part of the cable therein in such a manner that the part of the cable is wound around the cable housing groove from the radially outer side of the lens barrel is formed along the circumferential direction of the lens barrel so as to be exposed. Thus, in the present invention, even after the lens device is assembled, the lead-out length of the cable can be reduced by winding the cable around the exposed cable housing groove, and the lead-out length of the cable can be increased by removing the cable wound around the exposed cable housing groove from the cable housing groove. Consequently, the present invention can easily change the lead-out length of the cable led out from the lens device even after the lens device is assembled.

As described above, the lens device of the present invention can easily change the lead-out length of the cable led out from the lens device even after the lens device is assembled.

DETAILED DESCRIPTION OF THE PREFERRED EMBODIMENTS

Embodiments of the present invention will be described with reference to the accompanying drawings.

Structure of Lens Device

Figure 1:
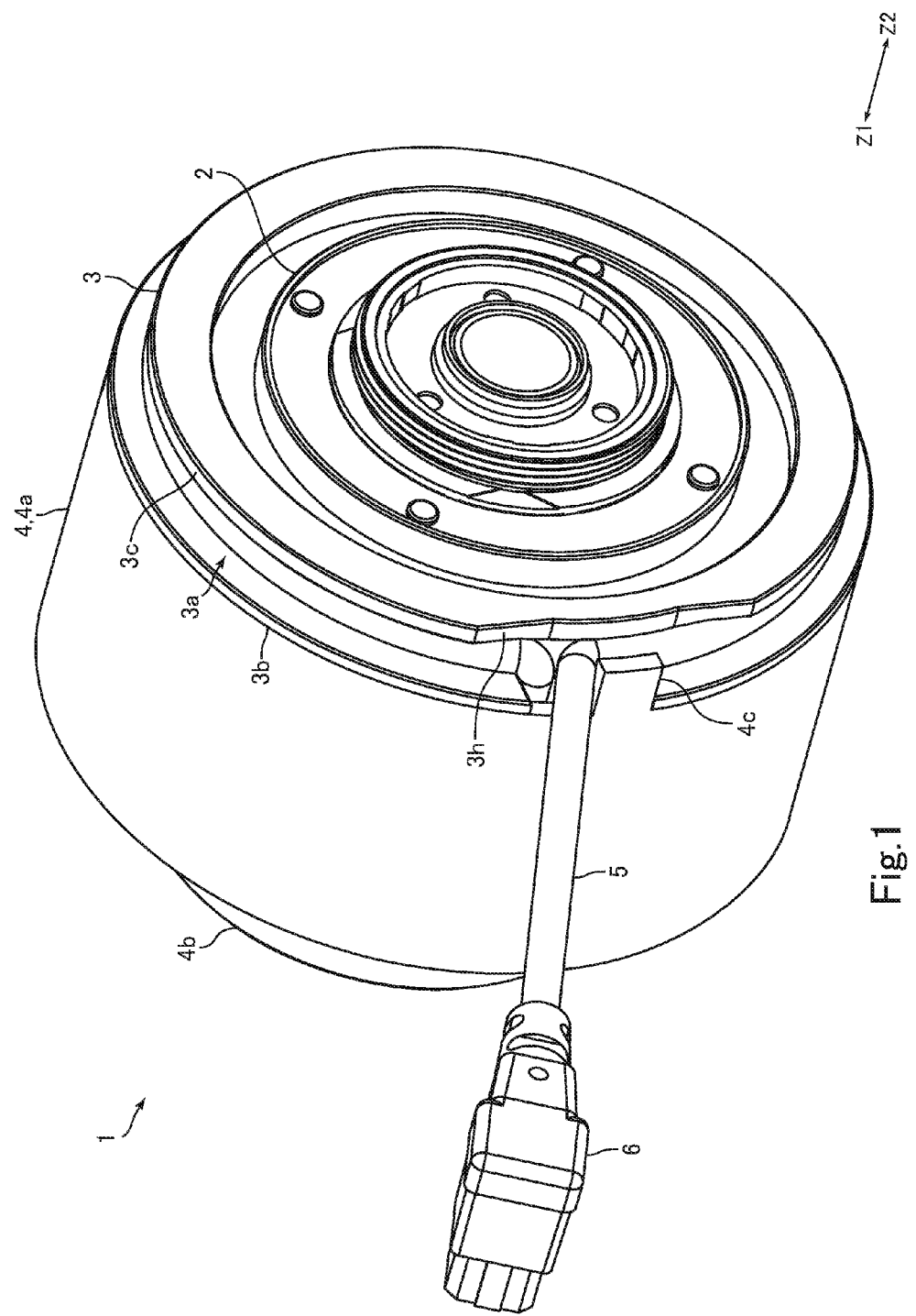
FIG. 1 is a perspective view of a lens device according to an embodiment of the present invention.
Figure 2:
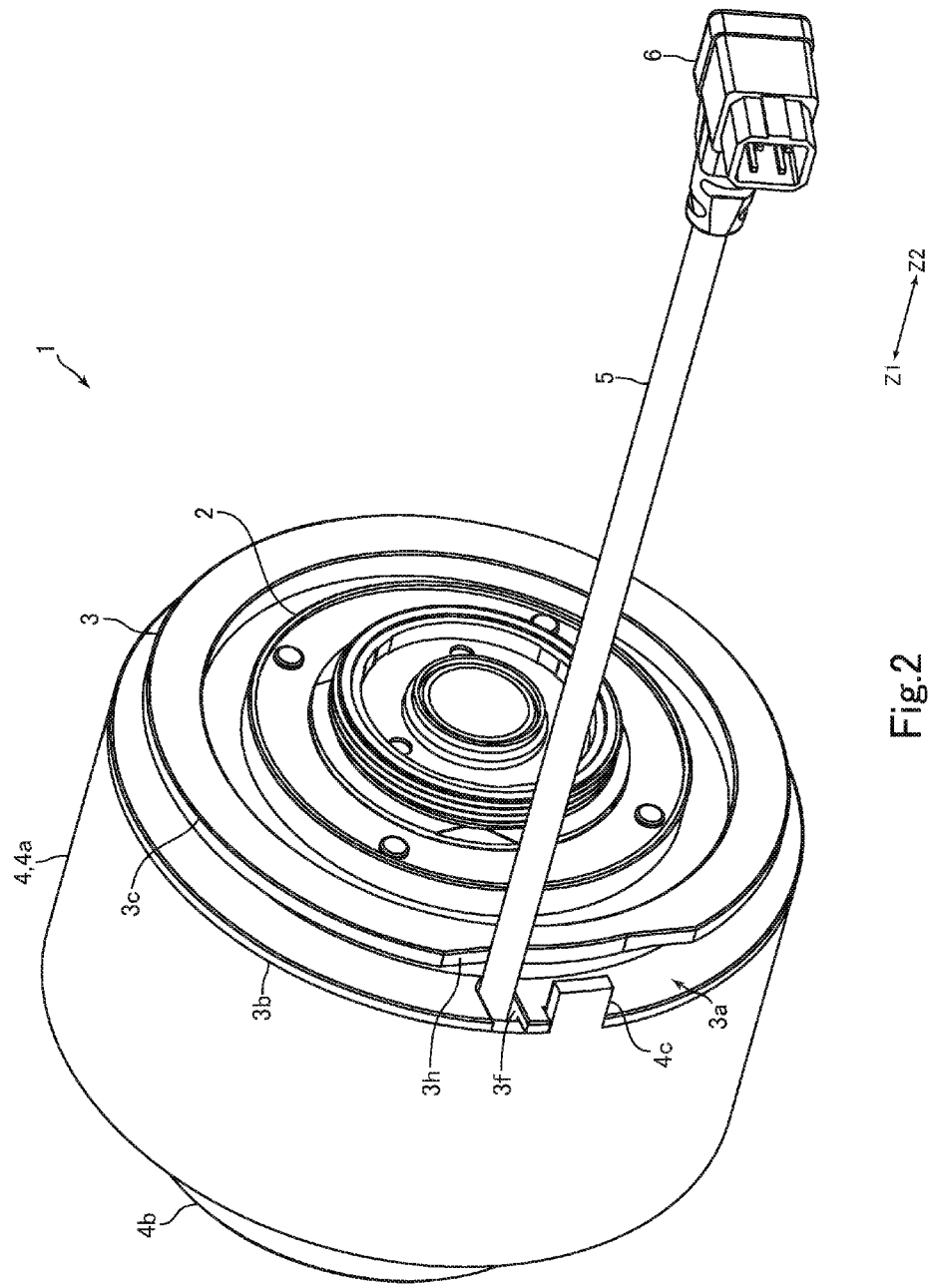
FIG. 2 is a perspective view of the lens device illustrated in FIG. 1, with a cable removed from a cable housing groove.
Figure 3:
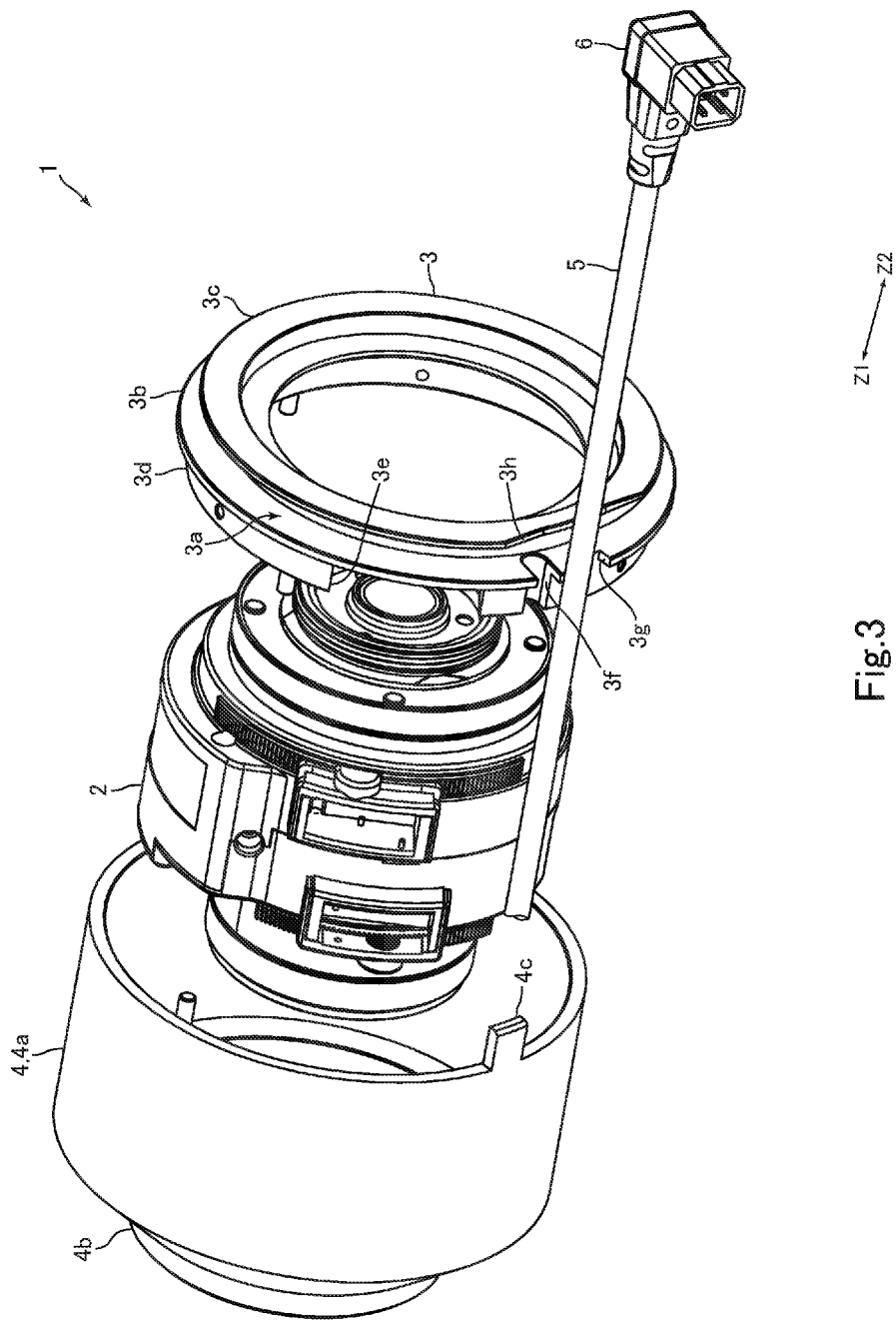
FIG. 3 is an exploded perspective view of the lens device illustrated in FIG. 1.
Figure 4:
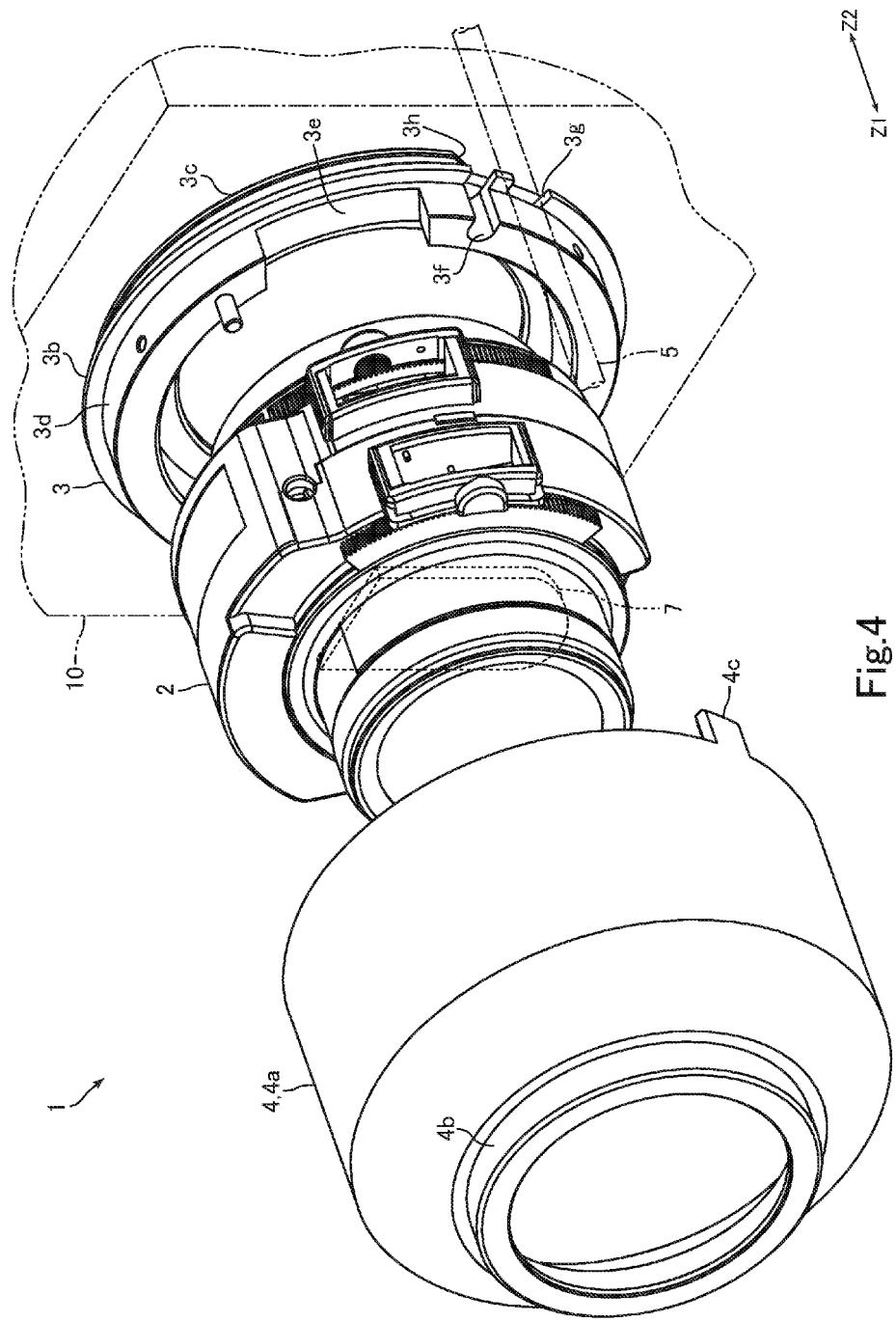
FIG. 4 is an exploded perspective view of the lens device illustrated in FIG. 1 in a direction different from that in FIG. 3.

FIG. 1 is a perspective view of a lens device 1 according to an embodiment of the present invention. FIG. 2 is a perspective view of the lens device 1 illustrated in FIG. 1, with a cable 5 removed from a cable housing groove 3a. FIG. 3 is an exploded perspective view of the lens device 1 illustrated in FIG. 1. FIG. 4 is an exploded perspective view of the lens device 1 illustrated in FIG. 1 in a direction different from that in FIG. 3. In the following description, a Z1-direction side in FIG. 1 and other figures is referred to as "front" side as a subject side, and a Z2-direction side is referred to as "rear (back)" side as an image-forming side.

The lens device 1 according to the present embodiment is mounted to an imaging apparatus 10 (see FIG. 4) for use. In other words, the lens device 1 is mountable to the imaging apparatus 10. The imaging apparatus 10 is, for example, a monitoring camera. The lens device 1 includes a lens barrel 2, an annular ring member 3 fixed to a rear end side of the lens barrel 2, and a cylindrical decorative barrel 4 configured to cover the lens barrel 2 from an outer circumferential side thereof. The lens device 1 has a function of automatically adjusting the aperture of the lens device 1 (auto iris function), and includes a control unit 7 (iris control unit; see FIG. 4) for aperture adjustment of the lens device 1, and a cable 5 (iris cable) having one end connected to the control unit 7. Note that a rear end side of the lens device 1 is mounted to the imaging apparatus 10. With the lens device 1 mounted to the imaging apparatus 10, the ring member 3 is arranged between the lens barrel 2 and the imaging apparatus 10.

A plurality of lenses are arranged inside the lens barrel 2. The above-mentioned control unit 7 (iris control unit) is mounted inside the lens barrel 2. A control unit for focus adjustment of the lens device 1 and a control unit for magnification adjustment of the lens device 1 are mounted to the lens barrel 2. A front-back direction in the present embodiment is an optical axis direction of the lens barrel 2, and the back direction (Z2 direction) is a first direction as one direction in the optical axis direction of the lens barrel 2. In the following description, a circumferential direction of an optical axis of the lens barrel 2 is referred to as "circumferential direction", and a radial direction orthogonal to the optical axis of the lens barrel 2 is referred to as "radial direction".

The decorative barrel 4 is formed into a substantially cylindrical shape. Specifically, the decorative barrel 4 is formed into a stepped substantially cylindrical shape, and includes a large-diameter portion 4a and a small-diameter portion 4b that has an outer diameter and an inner diameter smaller than those of the large-diameter portion 4a. The small-diameter portion 4b is continuous to the front end side of the large-diameter portion 4a to constitute a front end-side part of the decorative barrel 4. The decorative barrel 4 is arranged so that the optical axis direction of the decorative barrel 4 and the front-back direction are aligned with each other. A single protrusion 4c as a small piece, which protrudes toward the rear side, is formed at a rear end of the decorative barrel 4. Specifically, the protrusion 4c is formed at a rear end of the large-diameter portion 4a. The protrusion 4c protrudes toward the rear side from a part of the rear end of the large-diameter portion 4a in the circumferential direction. The protrusion 4c is formed into a curved plate shape with an arc. The radius of curvature of a radially inner surface of the protrusion 4c is equal to the radius of curvature of an inner circumferential surface of the large-diameter portion 4a. The radius of curvature of a radially outer surface of the protrusion 4c is equal to the radius of curvature of an outer circumferential surface of the large-diameter portion 4a.

The ring member 3 is formed separately from the lens barrel 2. The ring member 3 is formed into an annular shape as described above. Specifically, the ring member 3 is formed into a circular shape. A rear end-side part of the lens barrel 2 is arranged on the inner circumferential side of the ring member 3. A cable housing groove 3a configured to house a part of the cable 5 therein in such a manner that the part of the cable 5 is wound around the cable housing groove 3a from the radially outer side is formed on the outer circumferential side of a rear end-side part of the ring member 3. The cable housing groove 3a is formed along the circumferential direction over the entire circumference of the ring member 3. The cable 5 can be housed in the cable housing groove 3a along the circumferential direction. The cable housing groove 3a is formed into a rectangular groove that is recessed from an outer circumferential surface of the rear end-side part of the ring member 3 toward the radially inner side.

The ring member 3 includes an annular wall portion 3b constituting a front side surface of the cable housing groove 3a and an annular wall portion 3c constituting a rear side surface of the cable housing portion 3a. The wall portions 3b and 3c are formed into a circular shape. The outer diameter of the wall portion 3b is larger than the outer diameter of the wall portion 3c. The ring member 3 includes a circular front end portion 3d arranged on the front side of the wall portion 3b. The outer diameter of the front end portion 3d is smaller than the outer diameter of the wall portion 3b. The front end portion 3d is formed so as to be continuous to the front surface of the wall portion 3b. A recess 3e that is recessed from a front end surface of the front end portion 3d toward the rear side is formed in a part of the front end portion 3d in the circumferential direction.

A cable lead-in groove 3f, which communicates to the cable housing groove 3a from the front side and in which a part of the cable 5 is arranged, is formed in the ring member 3. The cable lead-in groove 3f is formed so that the length direction of the cable lead-in groove 3f and the front-back direction are aligned with each other, and is continuous to the cable housing groove 3a from the front side. The cable lead-in groove 3f is formed so as to be recessed toward the radially inner side from the outer circumferential surface of the ring member 3. Specifically, the cable lead-in groove 3f is formed so as to be recessed toward the radially inner side from an outer circumferential surface of the wall portion 3b and an outer circumferential surface of the front end portion 3d. The cable lead-in groove 3f is formed in the entire region of the front end portion 3d in the front-back direction and in the entire region of the wall portion 3b in the front-back direction. The cable lead-in groove 3f is formed so that the shape as viewed in the front-back direction is a substantially U-shape (shape in which the bottom portion is an arc and the side surfaces are flat). As viewed in the front-back direction, a radially inner end of the cable lead-in groove 3f overlaps with a radially inner side surface of the cable housing groove 3a. Specifically, the deepest part of the bottom portion of the cable lead-in groove 3f and the deepest part of the bottom portion of the cable housing groove 3a are arranged on the same plane. Thus, the cable 5 housed in the cable lead-in groove 3f and the cable housing groove 3a can be brought into contact with the bottom portions of the grooves even at a connection part of the cable lead-in groove 3f and the cable housing groove 3a. Consequently, the radial curvature of the cable 5 at the connection part of the bottom portions of the grooves can be restrained to reduce bending load of the cable 5.

A notch portion 3g to be engaged with a part of the protrusion 4c of the decorative barrel 4 on the front end side is formed in the wall portion 3b (see FIG. 4). The notch portion 3g is formed so as to be notched from the outer circumferential surface of the wall portion 3b toward the radially inner side. The notch portion 3g is formed so as to be adjacent to the cable lead-in groove 3f in the circumferential direction. Specifically, the protrusion 4c to be engaged with the notch portion 3g and the cable lead-in groove 3f are arranged so as to be adjacent to each other in the circumferential direction. In the present embodiment, the notch portion 3g is formed so as to be adjacent to the cable lead-in groove 3f in the state in which a slight gap is provided in the circumferential direction.

The decorative barrel 4 is fixed to the ring member 3 in the state in which the rear end of the decorative barrel 4 and the front surface of the wall portion 3b are in contact with each other and in the state in which a part of the protrusion 4c on the front end side is engaged with the notch portion 3g. With the ring member 3 and the decorative barrel 4 mounted to the lens barrel 2, the cable housing groove 3a is arranged behind the decorative barrel 4 and exposed to the outside of the lens device 1. Specifically, the cable housing groove 3a is formed so as to be exposed to the outside. With the decorative barrel 4 fixed to the ring member 3, a rear end-side part of the protrusion 4c covers a part of the cable housing groove 3a in the circumferential direction from the radially outer side. The protrusion 4c in the present embodiment is a covering portion configured to cover a part of the cable housing groove 3a in the circumferential direction from the radially outer side.

A notch portion 3h that is notched toward the radially inner side is formed on the outer circumferential side of the wall portion 3c. The notch portion 3h is formed in the wall portion 3c at a region behind the cable lead-in groove 3f and the notch portion 3g. Specifically, the notch portion 3h is formed in the wall portion 3c in a peripheral region of the cable lead-in groove 3f and the protrusion 4c. The notch portion 3h is formed in a predetermined range in the circumferential direction and the radial direction so that the cable 5 may be wound around the cable housing groove 3a and the cable 5 wound around the cable housing groove 3a may be removed from the cable housing groove 3a even in the state in which a part of the cable housing groove 3a in the circumferential direction is covered with the protrusion 4c from the radially outer side. In other words, the notch portion 3h is formed so that a clearance that allows the cable 5 to pass therethrough may be formed between the outer circumferential side of the wall portion 3c and the protrusion 4c. The notch portion 3h forms a clearance between the outer circumferential side of the wall portion 3c and the protrusion 4c, and hence the cable 5 can be housed in the cable housing groove 3a or removed from the cable housing groove 3a by using the clearance.

As described above, one end (base end) of the cable 5 is connected to the control unit 7 and arranged inside the decorative barrel 4. A connector 6 is attached to the other end (tip end) of the cable 5. The connector 6 is connected to the imaging apparatus 10 to which the lens device 1 is mounted. The cable 5 is led into the cable housing groove 3a from the inside of the decorative barrel 4 through the cable lead-in groove 3f. Specifically, the cable 5 is led into the cable housing groove 3a without being led out to the radially outer side of the decorative barrel 4. The cable 5 led into the cable housing groove 3a is led out to the radially outer side in the state in which the cable 5 is wound once around the cable housing groove 3a from the radially outer side and is folded in the state of being pressed against the protrusion 4c (more specifically, in the state of being pressed against a side surface of the protrusion 4c in the circumferential direction on the cable lead-in groove 3f side). Alternatively, the cable 5 led into the cable housing groove 3a is led out to the radially outer side by being directly folded (that is, without being wound around the cable housing groove 3a).

Main Effects of the Present Embodiment

As described above, in the present embodiment, the cable housing groove 3a configured to house a part of the cable 5 therein in such a manner that the part of the cable is wound around the cable housing groove 3a from the radially outer side is formed in the ring member 3, and the cable housing groove 3a is exposed to the outside of the lens device 1. Thus, in the present embodiment, even after the lens device 1 is assembled, the lead-out length of the cable 5 can be reduced by winding the cable 5 around the cable housing groove 3a, or the lead-out length of the cable 5 can be increased by removing the cable 5 wound around the cable housing groove 3a from the cable housing groove 3a. Consequently, the present embodiment can easily change the lead-out length of the cable 5 led out from the lens device 1 even after the lens device 1 is assembled. In the present embodiment, the cable housing groove 3a is exposed so that an opening part of the groove is directed to the radially outer side, and hence it is only necessary to rotate the cable 5 in the circumferential direction for housing the cable 5 into the cable housing groove 3a or removing the cable 5 from the cable housing groove 3a. Consequently, the cable 5 is easily housed into or removed from the cable housing groove 3a as compared with the case where the cable housing groove 3a is formed so that the opening part of the groove is directed to the rear side and the cable 5 is housed into or removed from the cable housing groove 3a from the rear side.

In the present embodiment, the cable lead-in groove 3f that communicates to the cable housing groove 3a from the front side is formed in the ring member 3, and the cable 5 is led into the cable housing groove 3a from the inside of the decorative barrel 4 through the cable lead-in groove 3f. Consequently, in the present embodiment, the lens device 1 can be downsized in the radial direction and the appearance of the lens device 1 can be improved as compared with the case where the cable 5 is led into the cable housing groove 3a from the radially outer side.

In the present embodiment, a part of the cable housing groove 3a in the circumferential direction is covered with the protrusion 4c from the radially outer side. Consequently, in the present embodiment, the cable 5 can be led out from the cable housing groove 3a in the state in which a part of the cable 5 wound around the cable housing groove 3a is pressed against the protrusion 4c. Thus, in the present embodiment, the lead-out position of the cable 5 from the cable housing groove 3a can be stabilized. In particular, in the present embodiment, the protrusion 4c and the cable lead-in groove 3f are arranged so as to be adjacent to each other in the circumferential direction, and hence the cable 5 can be led out from the cable housing groove 3a in the state in which a part of the cable 5 led out from the cable housing groove 3a is sandwiched between a part of the cable 5 led from the cable lead-in groove 3f and the protrusion 4c as illustrated in FIG. 1. Consequently, in the present embodiment, the lead-out position of the cable 5 from the cable housing groove 3a can be further stabilized.

In the present embodiment, the notch portion 3h is formed in the wall portion 3c of the ring member 3. The notch portion 3h is formed in a predetermined range in the circumferential direction and the radial direction so that the cable 5 may be wound around the cable housing groove 3a and the cable 5 wound around the cable housing groove 3a may be removed from the cable housing groove 3a even in the state in which a part of the cable housing groove 3a in the circumferential direction is covered with the protrusion 4c from the radially outer side. Consequently, in the present embodiment, even in the state in which the decorative barrel 4 is mounted to the lens barrel 2 and the ring member 3, the notch portion 3h can be used to easily wind the cable 5 around the cable housing groove 3a or easily remove the cable 5 wound around the cable housing groove 3a from the cable housing groove 3a.

In the present embodiment, the cable housing groove 3a is formed on the outer circumferential side of the ring member 3. Consequently, the present embodiment can relatively easily form the cable housing groove 3a as compared with the case where the cable housing groove 3a is formed in the lens barrel 2 that is liable to have a complicated shape. In the present embodiment, the protrusion 4c configured to cover a part of the cable housing groove 3a from the radially outer side is formed on the decorative barrel 4, and hence the protrusion 4c can be relatively easily formed as compared with the case where the protrusion 4c is formed on the lens barrel 2 or the ring member 3. In the present embodiment, when the lens device 1 is mounted to the imaging apparatus 10, the ring member 3 is arranged between the lens barrel 2 and the imaging apparatus 10, and hence the cable 5 led out from the cable housing groove 3a in the ring member 3 looks inconspicuous.

Other Embodiments

While one end of the cable 5 is connected to the control unit 7 for aperture adjustment of the lens device 1 in the embodiment described above, one end of the cable 5 may be connected to a control unit for focus adjustment of the lens device 1 or a control unit for magnification adjustment of the lens device 1. Note that the control unit for focus adjustment and the control unit for magnification adjustment may not be mounted to the lens barrel 2.

While the lens device 1 includes the ring member 3 in the embodiment described above, the lens device 1 may not include the ring member 3. In this case, the cable housing groove 3a is formed in the lens barrel 2. In this case, for example, the cable lead-in groove 3f is formed in the lens barrel 2. Note that, in this case, the cable lead-in groove 3f may not be formed in the lens barrel 2. In the embodiment described above, the cable lead-in groove 3f may not be formed in the ring member 3. When the cable lead-in groove 3f is not formed in the lens device 1, a lead-out hole or a lead-out groove for leading out the cable 5 to the radially outer side is formed in the decorative barrel 4, and the cable 5 led out from the decorative barrel 4 to the radially outer side is led into the cable housing groove 3a from the radially outer side.

While the protrusion 4c is arranged so as to be adjacent to the cable lead-in groove 3f in the circumferential direction in the embodiment described above, the protrusion 4c may not be adjacent to the cable lead-in groove 3f in the circumferential direction. While the single protrusion 4c is formed on the decorative barrel 4 in the embodiment described above, a plurality of the protrusions 4c may be formed on the decorative barrel 4. While the notch portion 3h is formed in the wall portion 3c in the embodiment described above, the notch portion 3h may not be formed in the wall portion 3c.

While the protrusion 4c is formed on the decorative barrel 4 in the embodiment described above, the protrusion 4c may not be formed on the decorative barrel 4. In this case, for example, the protrusion 4c may be formed on the wall portion 3b or the lens barrel 2. In this case, a covering portion that is formed separately from the lens barrel 2, the ring member 3, and the decorative barrel 4 may be fixed to the decorative barrel 4, for example. While the lens device 1 includes the decorative barrel 4 in the embodiment described above, the lens device 1 may not include the decorative barrel 4. In this case, for example, a covering portion configured to cover a part of the cable housing groove 3a in the circumferential direction from the radially outer side is formed on the lens barrel 2 or the wall portion 3b of the ring member 3. Note that the covering portion configured to cover a part of the cable housing groove 3a in the circumferential direction from the radially outer side may not be formed on the lens barrel 2, the ring member 3, or the decorative barrel 4.

What is claimed is:

1. A lens device, comprising:
   a lens barrel;
   a control unit mounted to the lens barrel; and
   a cable having one end connected to the control unit, wherein
   a cable housing groove circumferentially extends about the lens barrel, the cable housing groove opening radially outwardly relative to the lens barrel, the cable housing groove housing a part of the cable therein such that the part of the cable is wound within the cable housing groove from a radially outer side of the lens barrel so as to be exposed.

2. The lens device according to claim 1, wherein the lens device has a cable lead-in groove that communicates with the cable housing groove from one side in an optical axis direction of the lens barrel and in which another part of the cable is arranged.

3. The lens device according to claim 1, further comprising an annular ring member fixed to one end side of the lens barrel in an optical axis direction of the lens barrel, wherein
   the cable housing groove is on an outer circumferential side of the ring member.

4. The lens device according to claim 3, wherein
   the ring member has a cable lead-in groove that communicates with the cable housing groove from one side in the optical axis direction and in which another part of the cable is arranged, and
   the cable lead-in groove is recessed toward a radially inner side from an outer circumferential surface of the ring member.

5. The lens device according to claim 1, further comprising a covering portion covering a part of the cable housing groove in the circumferential direction from the radially outer side.

6. The lens device according to claim 5, wherein
   the lens device has a cable lead-in groove that communicates with the cable housing groove from one side in an optical axis direction of the lens barrel and in which another part of the cable is arranged, and
   the covering portion and the cable lead-in groove are adjacent to each other in the circumferential direction.

7. The lens device according to claim 5, further comprising a decorative barrel covering the lens barrel from an outer circumferential side, wherein
   the covering portion is at one end of the decorative barrel in an optical axis direction of the lens barrel.

8. The lens device according to claim 5, further comprising an annular ring member fixed to a first-direction end side of the lens barrel, the first direction being one direction in the optical axis direction, wherein
   the cable housing groove is on an outer circumferential side of the ring member,
   the ring member comprises an annular wall portion constituting a side surface of the cable housing groove on the first direction side, and
   the wall portion has, at a peripheral part of the covering portion on an outer circumferential side of the wall portion, a notch that is notched toward a radially inner side.

9. The lens device according to claim 3, wherein
   the lens device is mountable to an imaging apparatus, and in a state in which the lens device is mounted to the imaging apparatus, the ring member is between the lens barrel and the imaging apparatus.

\* \* \* \* \*